Dec. 31, 1940.  K. A. MAXWELL  2,227,193
METHOD OF WELDING JOINTS
Filed Aug. 23, 1939
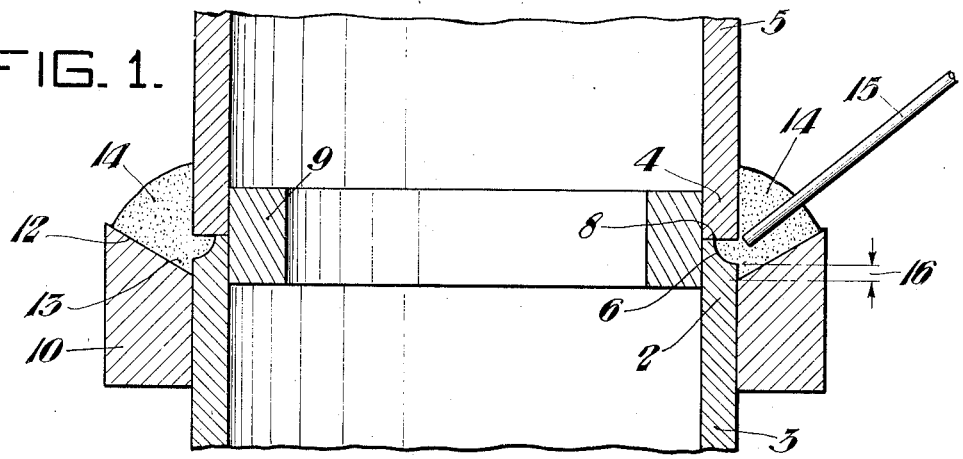
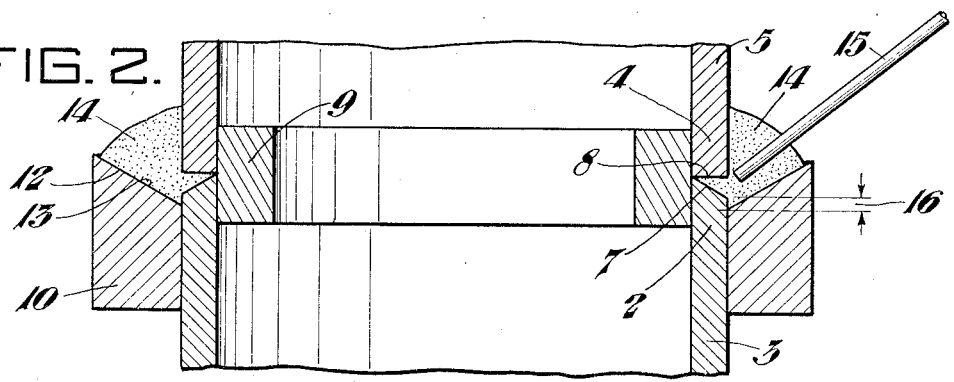
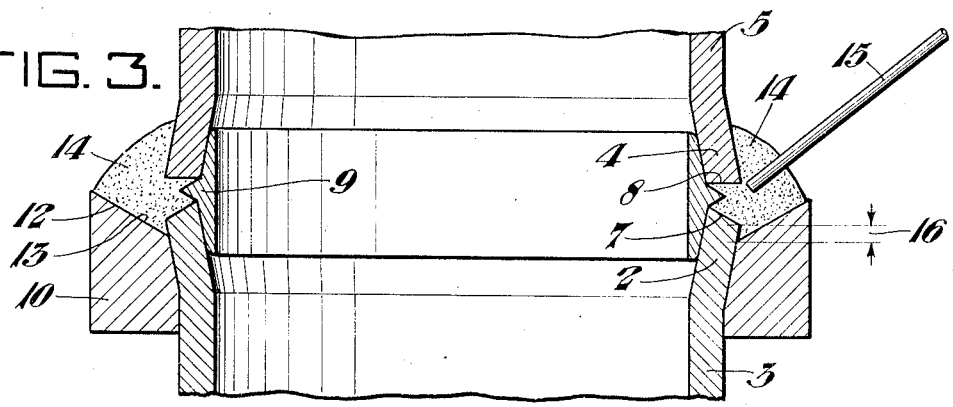
INVENTOR:
KARL A. MAXWELL,
BY John E. Jackson
HIS ATTORNEY.

Patented Dec. 31, 1940

2,227,193

UNITED STATES PATENT OFFICE 2,227,193

METHOD OF WELDING JOINTS

Karl A. Maxwell, Versailles Township, Allegheny County, Pa., assignor to National Tube Company, a corporation of New Jersey Application August 23, 1939, Serial No. 291,605

4 Claims. (Cl. 219—10)

This invention relates to welded joints and, particularly, to an improved method of welding vertically aligned metallic sections together.

Heretofore, the joints of vertically aligned sections, such as sections of pipe used in the sinking of oil well casings, have been joined together by means of hand welding. Such a method of joining sections of pipes, even when done by the most skillful operators, resulted in joints which were defective and in many respects unsatisfactory.

In the practice of the present invention, automatic welding heads can be used, thus obviating the necessity of highly skilled welding operators and, at the same time, providing joints which are stronger and more satisfactory in every respect, thereby eliminating the above named disadvantages.

Accordingly, it is one of the objects of the present invention to provide an improved method for welding vertically aligned sections together which is simple and inexpensive and, yet, one which produces a more rugged and uniform joint.

It is another object of the invention to provide an improved method for welding vertically aligned sections together with which an automatic welding head can be used, and one in which a welded joint can be made in a minimum amount of time.

It is a further object of the invention to provide an improved method for welding vertically aligned sections together in which a quantity of welding flux is disposed at all times around the joint, thereby providing an oxidation-resistant covering for the seam and the weld metal deposited therein.

Various other objects and advantages of my invention will be more apparent in the course of the following specification and will be particularly pointed out in the appended claims.

In the accompanying drawing there is shown, for the purpose of illustration, one embodiment which my invention may assume in practice.

In the drawing:

Figure 1 is a vertical section through the ends of a pair of vertically aligned pipes to be joined showing my improved method of joining the ends thereof and one way of scarfing the end of the lower pipe;

Figure 2 is a similar section showing another way of scarfing the end of the lower pipe; and, Figure 3 is a similar section showing still another way of scarfing the end of the same.

The improved method of joining ends of vertically aligned metallic sections is shown, merely for the purpose of illustration, in connection with joining vertically aligned pipe sections, such as in the making of an oil well casing, but it will be understood that my improved method can also be used for joining any other type of metallic cylindrical sections as well as other metallic sections which are not cylindrical.

Referring more particularly to the drawing, there is shown in Figure 1 the upper end 2 of a lower pipe section 3 and the lower end 4 of an upper pipe section 5, which are vertically aligned and adapted to be joined at their abutting end surfaces 2 and 4. The upper end 2 of the lower section 3 is "scarfed" by providing an outwardly beveled surface 6 therearound at an angle of approximately from 20 degrees to 45 degrees with the horizontal depending on the wall thickness of the pipe so as to provide sufficient clearance for the welding operation. The beveled upper end surface of the lower section may be a J or arcuate bevel, as shown in Figure 1, or it may be a full knife edge bevel 7, as shown in Figure 2 of the drawing. The lower end 4 of the upper section 5 is provided preferably with a straight horizontal end surface 8 or a beveled surface substantially less than that of the bevel of the end surface 6, as it has been found that better results can be obtained by having the lower end of the upper section straight than has been the practice heretofore; that is, beveling the lower end of the upper section and leaving the upper end of the lower section straight or slightly beveled, which caused severe undercutting thereby resulting in a greatly reduced cross-sectional area at the joint.

In welding operations, as is well-known to those skilled in the art, a heavy strip of copper, steel or other metal, known as a "backing-up strip," or a "backing-up chill ring" in the welding of pipes, is almost always applied to the surface of the members to be joined by welding along the line of the welding seam and on the side opposite to that from which the welding operation is to be performed for the purpose of preventing the molten weld metal from running out of the welding seam and to obtain a welded joint having a smooth back surface.

According to the present invention, there is arranged on the inside of the pipe sections 3 and 5 and thereagainst, opposite the seam therebetween at the joint, a conventional backing-up chill ring member 9. It has been found that better welding results can be obtained by employing a steel backing-up ring and, if such a ring is used, it is preferably permanently welded to the interior of the pipe sections at the joint and, in such a case, it is preferable that the pipe end portions 2 and 4 be belled, as shown in Figure 3 of the drawing, so as to maintain an interior diameter throughout the joint substantially equal to that of the pipe sections and to use the type of backing-up chill ring as is shown incorporated therewith.

There is suitably arranged around the upper end 2 of the lower pipe section 3 and thereagainst directly below the abutting ends of the joint and beveled end surface 6, an annular metallic (preferably copper) trough member 10, preferably having a high coefficient of conductivity. The top end surface 12 of the trough member 10 is inwardly beveled or tapered at a suitable angle or otherwise formed so as to provide a trough 13 between the member 10 and the pipe sections 3 and 5 at the joint which serves as a means for holding the welding flux and to control the shape of the welding bead, as will be hereinafter described.

In the welding operation, a quantity of welding flux 14 is deposited in the trough 13 at the joint around the ends of the pipe sections 3 and 5. A welding flux possessing the desired characteristics consists of Kittaning No. 3 clay plus additions of approximately 20 per cent manganese dioxide, approximately 2 per cent iron ore, approximately 2 per cent ferromanganese, and approximately 2 per cent cellulose (such as wood flour, starch, bran and the like), but it will be understood that any welding flux having the proper characteristics may be used. It has been found that the manganese dioxide in the flux has the effect of decreasing the melting rate of the welding electrode and increasing the penetration of the welding metal. It has also been found that, if it is desired to increase the melting rate of the electrode and decrease the penetration, titanium oxide may be substituted for or used in combination with the manganese dioxide.

The electrode or welding rod 15 having the proper amount of current connected thereto is then immersed in the welding flux and directed at the seam. A welding arc is then struck which causes the flux to become molten, thereby providing an effective oxidation-resistant covering for the deposited weld metal and further providing protection from the inert gases evolved. Striking of the arc also causes the end of the electrode or welding rod to be progressively melted and, as this metal is deposited in the seam, the electrode is advanced at a uniform rate therealong between the abutted ends of the sections to be joined until the joint has been welded.

It will be seen that, in the practice of this method of welding, it is preferable to use a welding head or machine which feeds the electrode or welding rod uniformly and moves it along the seam at a constant correlated speed. Such machine or welding head, if desired, may be provided with a hopper to deposit flux in the holder ahead of the weld rod. A machine of the type that may be used in the practice of the present invention is shown in the copending application of Moise and Passmore, Jr., Serial No. 256,812, filed February 16, 1939.

It will be understood that the copper or other suitable flux holding member 10 being of high heat conductivity, the molten flux adjacent thereto is chilled and has a molding effect on the shape of the weld metal bead. Thus, by changing the angle of the beveled surface 12 or distance 16 of the holder below the joint, the shape of the bead can be readily controlled. Furthermore, the chilling of the molten flux by the member 10 tends to force the weld metal inwardly into the seam between the ends of the abutted sections and materially aids in securing proper penetration to the inner edge thereof and also tends to deflect the arc into desired position. That is to say, the relatively non-conductive chilled flux tends to force the arc into the seam or welding groove although the electrode may not be directed at the seam.

As a result of my invention, it will be seen that by having the upper edge of the lower section suitably beveled, a space is provided for the deposited metal and an even distribution of heat is obtained, which results in a symmetrical welded cross-section at the joint and the elimination or material reduction of undercutting along the upper edge of the welded joint.

It will also be understood that this manner of automatically arc welding butt joints lends itself readily to the use of either alternating or direct current, and it has been found that, by using direct current of from 300 to 400 amperes and 25 volts, good welds can be obtained at a speed of 9 to 12 inches per minute.

While I have shown and described one embodiment of my invention, it will be understood that this embodiment is merely for the purpose of illustration and description and that various other forms may be devised within the scope of my invention, as defined by the appended claims.

I claim:

1. The method of joining the ends of vertically aligned metallic sections which includes the steps of placing, a flux holding member having a high coefficient of heat conductivity around one of the sections adjacent the joint, disposing a quantity of welding flux around the abutting ends of the sections at the joint on said flux holding member, immersing the end of a welding rod in the welding flux adjacent the abutting section ends, and electrically welding said section ends together by establishing an electric welding arc between the end of the welding rod and the abutting ends of the sections whereby the flux becomes molten and provides an oxidation-resistant covering for the weld metal as it is deposited along the seam between the abutted section ends at the joint, said flux holding member adapted to chill the molten flux thereby forcing the electric welding arc inwardly of the seam between the abutting ends of the sections, and molding the metal bead between the ends of the same.

2. The method of joining the ends of vertically aligned pipes which comprises providing the upper end of the lowermost pipe with an outwardly beveled end surface and the lower end of the uppermost pipe with a substantially straight and horizontal end surface, placing the uppermost pipe on the lowermost pipe with said ends in abutting relation, and includes the steps of placing a flux holding trough-like member having a high coefficient of heat conductivity around the lowermost pipe adjacent the joint, disposing a quantity of welding flux around the abutting ends of the pipes on said flux holding trough-like member, immersing the end of a welding rod in the welding flux adjacent said joint, and electrically welding the said pipe ends together by establishing an electric welding arc between the end of the welding rod and the abutting ends of the pipes whereby the flux becomes molten and provides an oxidation-resistant covering for the weld metal as it is deposited along the seam between the abutted ends of the pipes thereby providing a joint having a uniform amount of metal therein, said flux holding trough-like member adapted to chill the molten flux thereby forcing the electric welding arc inwardly of the seam between the abutting ends of the pipes, with the bevel on the upper end of the lowermost pipe in conjunction wtih the straight and horizontal end surface on the lower end of the uppermost pipe adapted to prevent undercutting of the end of the uppermost pipe.

3. The method of joining ends of vertically aligned metallic sections which comprises providing at least the upper end of the lowermost section with an outwardly relieved end surface, placing the metallic sections together so that the lower end of the uppermost section abuts the relieved end of the lowermost section, and includes the steps of placing a flux holding means having a high coefficient of heat conductivity around the lowermost section adjacent the joint, disposing a quantity of welding flux around the abutting ends of the sections on said metallic flux holding means, immersing the end of a welding rod in the welding flux adjacent the abutting section ends, and electrically welding the abutting ends of said section together by establishing an electric welding arc between the end of the welding rod and the abutting ends of the sections whereby the flux becomes molten and provides an oxidation-resistant covering for the weld metal as it is deposited along the seam at the joint, said metallic flux holding means adapted to chill the molten flux thereby forcing the electric welding arc inwardly of the seam between the abutting ends of the sections and molding the shape of the weld metal bead at the seam with the relieved end surface on the lowermost section in conjunction with the end of the uppermost section adapted to prevent undercutting of the end of the uppermost section.

4. The method of joining the ends of vertically aligned metallic sections which includes the steps of placing a flux holding member having a high coefficient of heat conductivity around one of the sections adjacent the joint, disposing a quantity of welding flux around the ends of the sections at the joint on said flux holding member, immersing the end of a welding rod in the welding flux adjacent the section ends, and electrically welding said section ends together by establishing an electric welding arc between the end of the welding rod and the ends of the sections whereby the flux becomes molten and provides an oxidation-resistant covering for the weld metal as it is deposited at the joint, said flux holding member adapted to chill the molten flux thereby forcing the electric welding arc inwardly at the joint at the ends of the sections and molding the metal bead between the sections at the joint.

KARL A. MAXWELL.